United States Patent [19]

Surat

[11] Patent Number: 4,464,921

[45] Date of Patent: Aug. 14, 1984

[54] ARRANGEMENT FOR CONTROLLING A CONTROLLED DEFLECTION ROLL

[75] Inventor: Miroslav Surat, Wilhelmsdorf-Zussdorf, Fed. Rep. of Germany

[73] Assignee: Escher Wyss Aktiengesellschaft, Zurich, Switzerland

[21] Appl. No.: 370,741

[22] Filed: Apr. 22, 1982

[30] Foreign Application Priority Data

May 2, 1981 [DE] Fed. Rep. of Germany ....... 3117516

[51] Int. Cl.³ .................. B21B 37/08; B30B 15/14
[52] U.S. Cl. .................. 72/243; 29/113 AD; 29/116 AD; 72/8; 72/245; 100/162 B
[58] Field of Search ............ 72/241, 243, 245, 8, 72/20; 29/113 AD, 116 AD; 100/47, 162 B, 170

[56] References Cited

U.S. PATENT DOCUMENTS

| | | | |
|---|---|---|---|
| 4,023,480 | 5/1977 | Biondetti | 72/243 X |
| 4,074,624 | 2/1978 | Biörnstad et al. | 72/20 X |
| 4,282,639 | 8/1981 | Christ et al. | 100/162 B X |
| 4,319,522 | 3/1982 | Marchioro et al. | 29/116 AD X |
| 4,357,743 | 11/1982 | Heffer et al. | 29/116 AD |

*Primary Examiner*—Francis S. Husar
*Assistant Examiner*—Steven B. Katz
*Attorney, Agent, or Firm*—Werner W. Kleeman

[57] ABSTRACT

In roll arrangements composed of a controlled deflection roll and a counter element the controlled deflection roll is supported by discrete force-applying sources. On the one hand, these force-applying sources are set or adjusted in accordance with a predeterminable mean pressing force and, on the other hand, also can be externally corrected. An external correction also influences the pressing force at the region of neighboring force-applying sources, sometimes in an undesired fashion. According to the invention when there is accomplished an external correction there is acted upon in an opposite sense at least one force-applying source neighboring the externally corrected force-applying source.

9 Claims, 3 Drawing Figures

ARRANGEMENT FOR CONTROLLING A CONTROLLED DEFLECTION ROLL

BACKGROUND OF THE INVENTION

The present invention relates to a new and improved arrangement for controlling a controlled deflection roll.

Generally speaking, there is contemplated an arrangement for controlling the pressing force between a counter element and a controlled deflection roll, wherein the roll shell of such controlled deflection roll can be pressed by force-applying sources against the counter element. These force-applying sources are arranged in a distributed fashion in the axial direction of the roll shell and are supported upon a roll support or beam. In each case groups of force-applying sources can be separately controlled, and there is provided a common adjustment or setting element for a desired pressing force for generating a common control signal. This control signal is converted by converters correlated to a respective group of force-applying sources into group control signals in such a manner that at the range of the pressing forces which are to be adjusted there can be minimized the deviations from a pressing force-mean value lengthwise of the controlled deflection roll. The group control signals can be influenced by externally generated correction signals. An arrangement of this type is disclosed in the commonly assigned, copending U.S. application Ser. No. 334,642, filed Dec. 28, 1981.

The possibility of being able, in principle, to work with the same mean line force, but however being able to undertake corrections at zones, enables compensating errors in the material web which is being processed. These errors are for instance caused by machines arranged forwardly or upstream of the roll system or could be caused by downstream or subsequently arranged machines. Such irregularities of the material web otherwise would also not be compensated after the roll nip when working with a pressing force which is essentially constant along the roll width. The machine operator can however monitor the rolled product and eliminate such irregularities by individually adjusting the pressing force. As an alternative approach it would also be possible to measure the properties of the material web following the roll nip and to feed back appropriate correction signals to the converters, as such has been disclosed in German Patent Publication No. 2,555,677 and in the cognate U.S. Pat. No. 4,074,624, issued to Biörnstad et al on Feb. 21, 1978.

Supporting of the roll shell upon the force-applying sources arranged in an offset fashion in axial direction, that is to say, engaging or acting to a certain extent "locally" at the roll shell, presupposes that the roll shell possesses sufficient rigidity or stiffness in order to bridge the so-to-speak "gaps" between the individual points of application or attack of the force-applying sources. On the other hand, this means however that, when influencing a certain zone of the roll nip by means of a correction signal for the related group of force-applying sources at least also the neighbouring zones are adjusted or altered in the same sense, if even to a lesser degree. In an extreme case the situation can then arise that instead of attaining the desired result as to the quality of the rolled stock or product there is, in fact, produced an entirely different course or characteristic of the profile of the rolled stock. That obviously is highly undesirable because the machine operator can no longer recognize any unambiguous correlation between the settings undertaken by him or her and the end result.

SUMMARY OF THE INVENTION

Therefore, with the foregoing in mind it is a primary object of the present invention to provide a new and improved arrangement for controlling a controlled deflection roll in a manner not afflicted with the aforementioned drawbacks and limitations.

Another and more specific object of the present invention relates to a new and improved arrangement for controlling the pressing force between a controlled deflection roll and a counter element in a manner such that upon imposing a correction signal there essentially only arises the desired correction action at the part of the roll nip which is affected by the correction signal.

Now in order to implement these and still further objects of the invention, which will become more readily apparent as the description proceeds, the inventive control arrangement is manifested by the features that, there is provided a compensation arrangement by means of which, upon influencing a group control signal by a correction signal at least one further group control signal can have impressed or imposed thereon, with a compensating effective direction, an auxiliary correction signal.

Accordingly, upon influencing the group of force-applying sources of any given zone there is simultaneously caused the influencing of at least one further group of force-applying sources, preferably the group of force-applying sources at the neighbouring zone, or, however, with somewhat greater equipment expenditure, the groups of force-applying sources of all of the zones in such a manner that, to a certain extent the rigidity of the roll shell is compensated by the action of the related force-applying sources. Even if this is only accomplished in a rather coarse or rough fashion there is realised an appreciable improvement, and, in particular, the machine operator can detect a logical correlation between the undertaken manipulations and the result appearing at the rolled product.

The relationship, on the one hand, between the magnitude of the correction adjustment signal and, on the other hand, the auxiliary correction signal or auxiliary correction signals which is or are effective in a compensating sense, is dependent upon the momentarily prevailing conditions. There can be provided a regulation system which is structured such that the pre-set mean line force is again set or reestablished, in other words, to a certain extent the sum of the group-adjustment magnitudes again assumes the value which was predetermined prior to impressing the correction signal. Also, the magnitude of the auxiliary correction signal can be made dependent upon the position of that zone which is itself impinged with the correction signal and/or upon the position of the remaining zones relative thereto.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
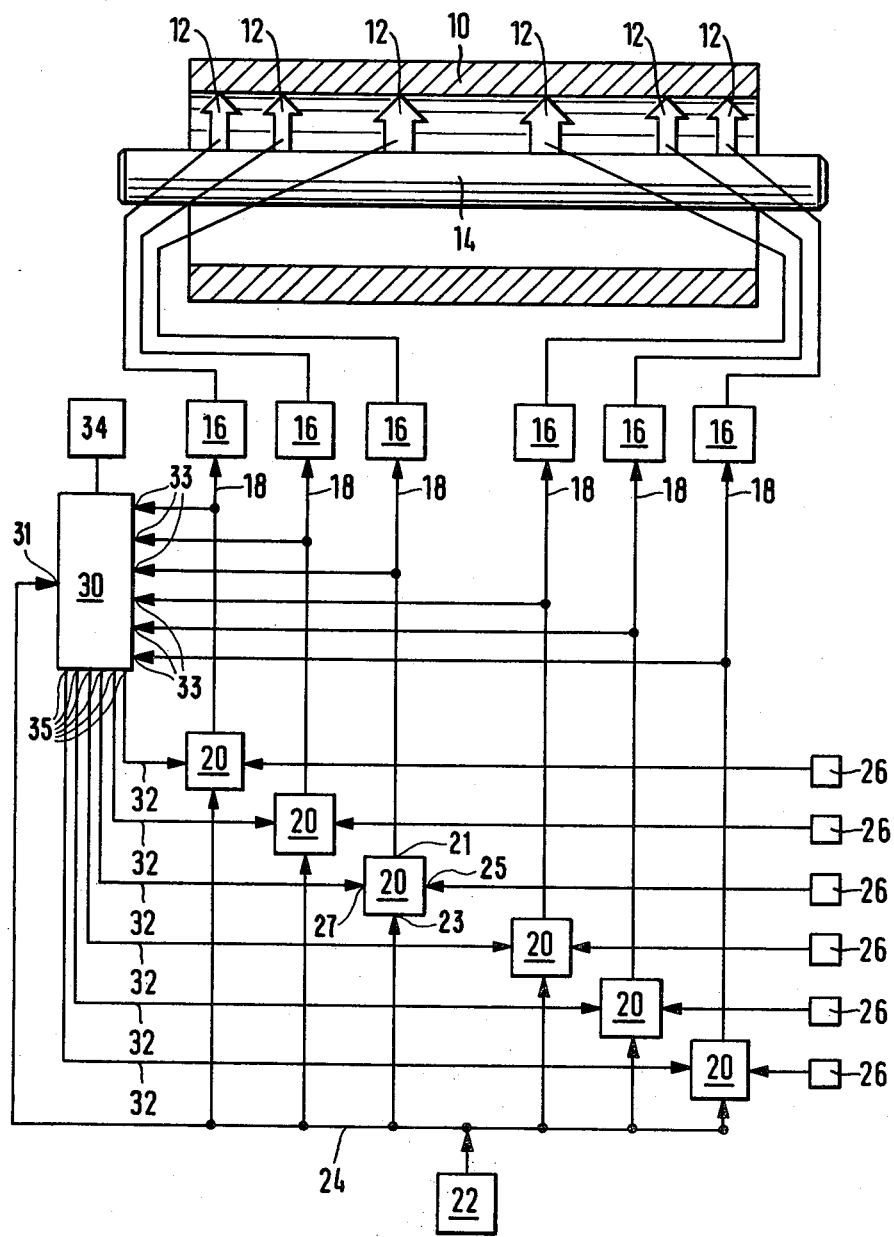
FIG. 1 schematically illustrates an arrangement for controlling a controlled deflection roll according to the invention.

Describing now the drawings, it is to be understood that only enough of the construction of the controlled deflection roll has been shown as will enable those skilled in this art to readily understand the underlying principles and concepts of the present development, while simplifying the illustration of the drawings. Turning attention now specifically to FIG. 1, there has been shown schematically therein a controlled deflection roll composed of a roll shell 10 which is supported upon a roll support or beam 14 by means of force-applying sources 12, typically constituted by suitable pressure or support elements as is well known in this art. It is to be here remarked that in the exemplary illustrated embodiment the roll shell 10 which, in fact, is in the form of a hollow cylinder itself has a so-to-speak jacket or shell configuration. Of course, the invention is also useful in those instances where the roll shell, viewed geometrically, constitutes the outer or jacket surface of a solid cylinder, whereas the roll support then is located externally of this solid cylinder at the side facing away from the force-applying direction. The force-applying sources 12 can be, for instance, constituted by conventional hydrostatic bearings, the supporting force of which is dependent upon the magnitude of the applied fluid pressure, typically the oil pressure. However, the force-applying sources also could be, for instance, electromagnetic force-applying sources. Additionally, the force-applying sources also can be effective in the opposite direction, particularly at the marginal or end regions of the roll shell 10, in other words the force-applying sources could be "negative" force-applying sources. Finally, under the term "force-applying sources", as used herein, there is to be generally understood those arrangements which locally exert a support or pressure force upon the roll shell—i.e. meaning at discrete locations distributed along the roll nip—which deviates from the support forces effective at their neighbourhood or neighbouring regions upon the roll shell. As to the last-mentioned case there are included also, for instance, arrangements wherein a hydraulic pressure is effective along the entire length of the roll shell upon a sector confronting a counter roll and which locally is reduced by "pressure sinks".

It is assumed that there are provided hydrostatic support or pressure sources as the force-applying sources 12, and specifically, there are provided a total of 32 force-applying sources 12 which are distributed at a substantially uniform spacing from one another axially along the roll shell 10. The support or force-applying sources 12 are grouped together into, for instance, a total of six groups which, in each case, are impinged with the same pressure, and starting from the edge or marginal region of the controlled deflection roll the first group contains four support sources, the second group likewise four support sources, the third group eight support sources, the fourth group likewise eight support sources in mirror symmetrical arrangement, the fifth group four support sources, and the sixth group likewise four support sources. Accordingly, there are only required six control valves 16 or equivalent structure which infeed to the individual support source groups, symbolised by a respective arrow in FIG. 1, reduced work pressures in accordance with the electrical adjustment or setting signals or magnitudes which are inputted to each such control valves 16 by means of the related signal lines or conductors 18.

The adjustment or setting signals appearing at the lines 18 are delivered by converters 20. All of the converters 20 receive the same common control signal from an adjustment or setting element 22 by means of the correspondingly branched line network or lines 24 and a related first input 23, and each converter 20 processes the thus received common control signal in accordance with a predetermined function, for instance a linear function, into an appropriate group control signal appearing at the related converter output 21, all of which group control signals act in such a manner that, for instance, there appear along the roll nip as small as possible deviations from the value of the pressing or contact force which has been predetermined or predestined by the adjustment element 22.

Additionally, the magnitude of the adjustment or setting signal appearing at each input line or conductor 18 can also be individually adjusted or set, and this has been indicated in FIG. 1 by the group or zone adjustment or setting elements 26 each of which is connected to a second input 25 of a related converter 20.

As to the previously discussed aspects the arrangement of FIG. 1 generally corresponds to the state-of-the-art as presently known and which was discussed at the introductory portion of this disclosure.

Turning now to the diagram of FIG. 2 there has been plotted along the abscissa, corresponding to the length of the roll nip or gap, the magnitude of the mean line force L at the roll nip, and specifically, by means of the chain-dot line as a constant for a value of, for instance, 50 N/mm if there are effective at the roll zones 1 to 6 the adjustment magnitudes indicated below in Table I in the column labelled "Without Correction", these adjustment or setting magnitudes constituting optional units which are only to be understood on a relative basis, but in a concrete example or situation can be constituted by, for instance, oil pressures:

TABLE I

| | Adjustment Magnitude | |
|---|---|---|
| | Without Correction | With Correction |
| Zone 1 | 8.7 | 8.7 |
| Zone 2 | 14.0 | 14.0 |
| Zone 3 | 16.9 | 25.9 |
| Zone 4 | 16.9 | 16.9 |
| Zone 5 | 14.0 | 14.0 |
| Zone 6 | 8.7 | 8.7 |

In the column labelled "With Correction" the values for the zones 1, 2, 4, 5 and 6 are unchanged, whereas at the zone 3 the adjustment or setting magnitude has been increased from 16.9 to 25.9, for instance by actuating the corresponding zone adjustment element 26 in order to compensate at the corresponding location of the material web an error which is predicated upon an upstream or downstream located piece of equipment or machine.

Figure 2:
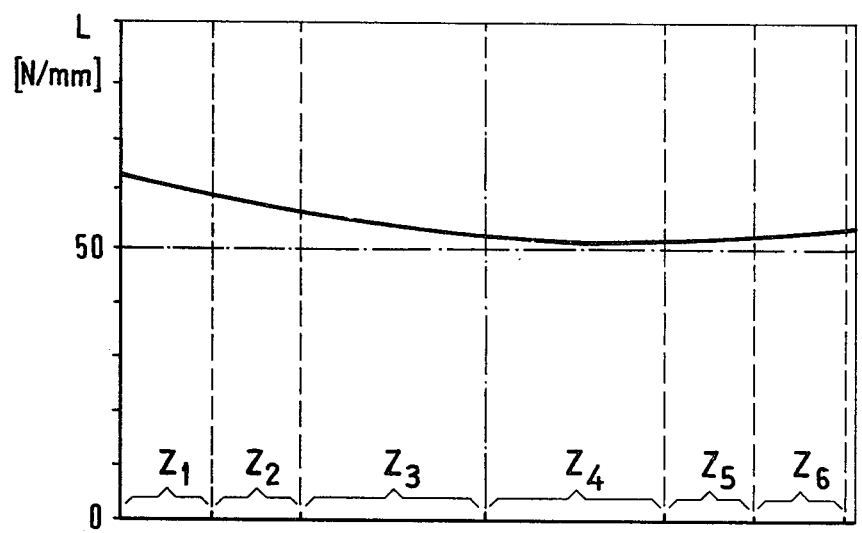
FIG. 2 illustrates the course of the pressing force along the controlled deflection roll for the data indicated in Table I appearing hereinafter, wherein the line force is plotted along the ordinate and the roll zones along the abscissa.

The result of this operation has been depicted in FIG. 2 with a solid or full line. There will be clearly recognised that the result is in no way satisfactory. The correction at the zone 3 is predominantly effective at the zone 2 and also to an even greater extent at the zone 1, but hardly at the zone 3. The machine operator therefore is required to carry out further manipulations at the other zone adjustment elements 26. However, considerable experience is needed in order to reasonably rapidly arrive at a desired satisfactory result.

In order to simplify these manipulations or correction operations the arrangement is augmented, according to the invention, by the additional components which have been illustrated in FIG. 1 and will be discussed more fully hereinafter.

The momentary actual value of the adjustment or setting magnitudes appearing at the lines or conductors 18 are fed to related second inputs 33 of a regulator 30, constituting a compensation arrangement, at which there is impressed or inputted as a reference or set value, by means of the line or conductor 24 and a first input 31, the predetermined mean line force. From these magnitudes the regulator 30 forms auxiliary correction signals which are inputted from related outputs 35 and via related lines 32 to third inputs 27 of the related or individual converters 20. Basically what happens is that with a manipulation undertaken at the zone adjustment or setting elements 26 the auxiliary correction signals, as to their effective direction, oppose such manipulation and at least are impressed upon the converter or converters 20 which are located most neighbouring to the converter influenced by the related zone adjustment or setting element 26. If, for instance, according to the example of FIG. 2, the zone 3 is externally corrected then the regulator 30 delivers auxiliary correction signals at least respective to the converters 20 for the zones 2 and 4. The construction of the regulator 30 can however be refined or upgraded somewhat—by taking into account the momentarily prevailing roll system—for instance in that it takes into account in the manner of an entire matrix both the position of the externally corrected zones as well as also the magnitude of the correction manipulation and delivers, in accordance with their magnitudes, stepped auxiliary correction signals for all converters 20, and the auxiliary correction becomes that much more intensified the closer the auxiliary corrected zones are to the externally corrected zone.

Figure 3:
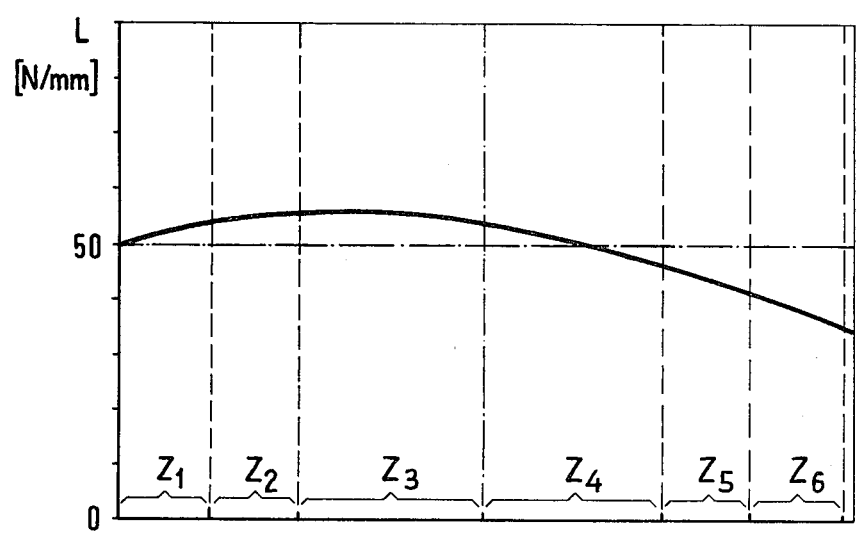
FIG. 3 illustrates the course of the pressing force, in a similar illustration as the showing of FIG. 2, for the data appearing in Table II given hereinafter.

In the exemplary embodiment it has been assumed that the regulator 30 simply so-to-speak "sums-up" the adjustment magnitudes of the lines 18 and in the event of a deviation from the reference or set value appearing at the line 24 linearly inputs to all the converters 20, with the exception of the externally corrected converter, by means of the lines 32 the same auxiliary correction signal until there has been completely regulated-out or corrected the error. In such case the regulator 30 is designed as an I-regulator or controller. Even this extremely simple and relatively uncomplicated construction still produces an appreciable improvement. FIG. 3 illustrates the thus obtained course of the line force in a representation analagous to the showing of FIG. 2.

The related adjustment magnitudes in the individual zones have been reiterated in the following Table II:

TABLE II

|  | Adjustment Magnitudes |
| --- | --- |
| Zone 1 | 5.7 |
| Zone 2 | 11.0 |
| Zone 3 | 25.9 |
| Zone 4 | 13.9 |
| Zone 5 | 11.0 |

TABLE II-continued

|  | Adjustment Magnitudes |
| --- | --- |
| Zone 6 | 5.7 |

It will be recognised that, in particular, now the correction, i.e. the externally influenced increase in the line force at the region of the zone 3, in fact completely dominatingly only comes into play in such zone 3 and that, in particular, the completely undesired increase of the marginal or edge compression at the zone 1, recognisable from the diagram of FIG. 2, has almost completely disappeared. However, there will be also recognised that at the region of the zones 5 and 6, which are located far removed from the corrected zone 3, the auxiliary correction leads to an undesired result and there can be required a post-improvement by the machine operator. But even then the result is unambiguously predictable as practical applications have shown. This drawback can however be eliminated by further appropriately upgrading or refining the regulator 30 as explained previously.

Since the regulator 30, among other things, also detects extreme deviations which have been inputted for correction purposes by the machine operator at the output magnitudes at one or the other of the lines 18, it is possible to trigger an alarm signal at an alarm signal transmitter 34 upon exceeding a predetermined threshold value, because in such case there is then present at one of the upstream or downstream located machines an error which imperatively requires correction.

While there are shown and described present preferred embodiments of the invention, it is to be distinctly understood that the invention is not limited thereto, but may be otherwise variously embodied and practiced within the scope of the following claims. Accordingly,

What I claim is:

1. An arrangement for controlling the pressing force between a controlled deflection roll and a counter element, wherein:

the controlled deflection roll comprises a roll shell and a roll support;

a plurality of force-applying sources supported at the roll support and distributively arranged in the axial direction of the roll shell for pressing the roll shell against the counter element;

said force-applying sources being divided into a predetermined number of groups of such force-applying sources, each of which groups can be separately controlled;

a common adjustment element for a desired pressing force and for generating a common control signal;

a predetermined number of converters;

each said converter having a first input, a second input, a third input and an output;

said first input of each said converter being connected to said common adjustment element to receive therefrom said common control signal and said output of each said converter being operatively connected to control a related one of said groups of force-applying sources by supplying thereto a related group control signal;

said group control signals adjusting the pressing forces applied by said groups of force-applying sources such that there can be maintained at a minimum deviations of the individual pressing forces from a mean value of the pressing force along the controlled deflection roll and which mean value corresponds to said desired pressing force adjusted at said common adjustment element;

means connected to said second inputs of said converters for producing external correction signals for influencing at least one related group control signal by means of a related one of said converters;

a compensating arrangement having a first input, a predetermined number of second inputs and a predetermined number of outputs;

said first input of said compensating arrangement being connected to said common adjustment element to receive therefrom said common control signal;

each said second input of said compensating arrangement being operatively connected to said output of a related one of said converters to receive therefrom a related group control signal;

each said output of said compensating arrangement being connected to said third input of a related converter to deliver thereto an auxiliary correction signal; and said compensation arrangement, when at least one correction signal is supplied to at least one of said converters by said external correction signal-producing means, counteracting by means of at least one delivered auxiliary correction signal a variation in at least one group control signal generated by at least one further converter other than said at least one converter.

2. The arrangement as defined in claim 1, wherein:
said compensation arrangement delivers auxiliary correction signals of a magnitude which is dependent upon the position of the related groups of force-applying sources relative to the at least one group of force-applying sources which is operatively connected with said at least one converter supplied with said at least one correction signal by said external correction-signal producing means.

3. The arrangement as defined in claim 1, wherein:
said compensation arrangement counteracts variations in all said group control signals with the exception of the group control signal originating from said at least one converter to which said at least one correction signal is supplied.

4. The arrangement as defined in claim 1, wherein:
said compensation arrangement counteracts the variations in all said group control signals including the group control signal originating from said at least one converter to which said at least one correction signal is supplied.

5. The arrangement as defined in claim 1, wherein:
said compensation arrangement generates auxiliary correction signals of a magnitude such that a resultant mean pressing force over the roll length substantially corresponds to said desired pressing force adjusted at said common adjustment element.

6. The arrangement as defined in claim 2, wherein:
said compensation arrangement generates auxiliary correction signals of a magnitude which is dependent upon the position of the group of force-applying sources operatively connected with said at least one converter to which said at least one correction signal is supplied.

7. The arrangement as defined in claim 1, wherein:
said compensation arrangement contains an alarm transmitter which is triggered when said externally generated correction signals exceed predetermined threshold values.

8. The arrangement as defined in claim 1, wherein:
said controlled deflection roll defines two end regions;

said groups of force-applying sources comprising marginal groups each of which is operatively associated with one of said end regions of said controlled deflection roll; and at least one said auxiliary correction signal being supplied to at least one of the converters operatively connected to a related group of force-applying sources which is immediately adjacent a related one of said marginal groups of force-applying sources, when the correction signal is supplied to at least one of the converters operatively connected with at least one of said marginal groups of force-applying sources.

9. The arrangement as defined in claim 1, wherein:
said auxiliary correction signals are supplied to the converters operatively connected to related groups of force-applying sources which are immediately adjacent to a group of force-applying sources which is operatively connected with said at least one converter supplied with said at least one correction signal.

* * * * *